Jan. 20, 1953 J. E. GAYLOR 2,625,855
ADJUSTABLE HEAD-SUPPORTED BINOCULARS
Filed Jan. 30, 1950 2 SHEETS—SHEET 1

INVENTOR.
JAMES E. GAYLOR
BY
PATENT AGENT

Jan. 20, 1953  J. E. GAYLOR  2,625,855
ADJUSTABLE HEAD-SUPPORTED BINOCULARS
Filed Jan. 30, 1950  2 SHEETS—SHEET 2
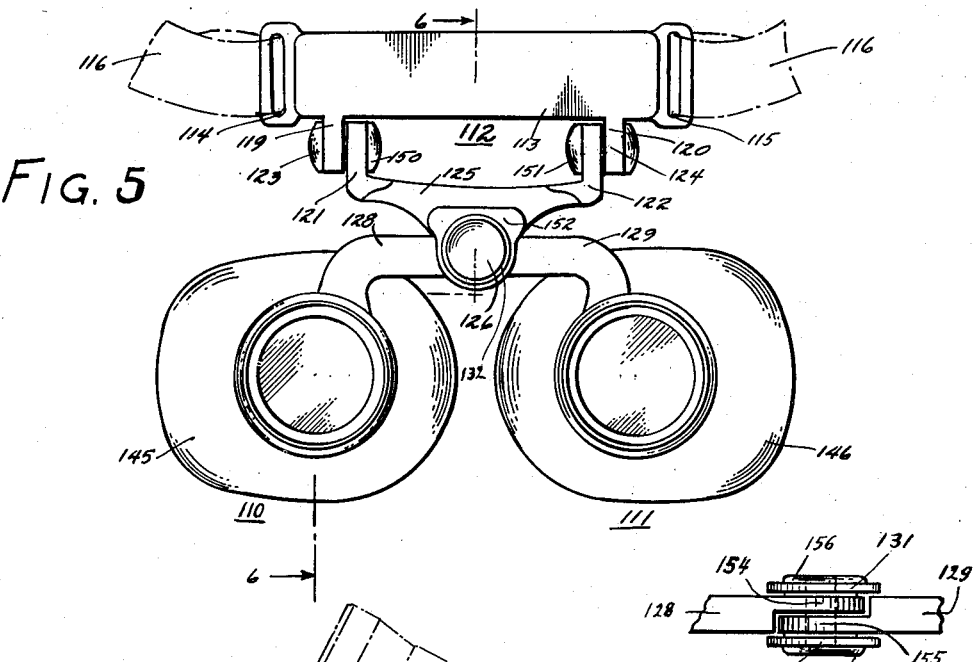
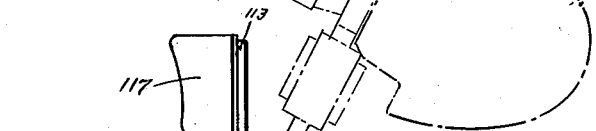
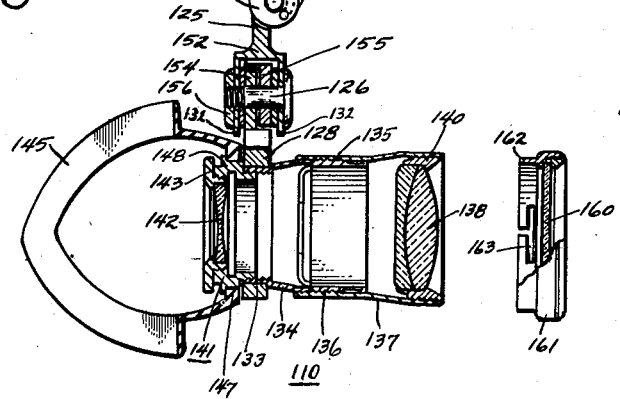
INVENTOR
JAMES E. GAYLOR
BY
PATENT AGENT Patented Jan. 20, 1953

2,625,855

UNITED STATES PATENT OFFICE 2,625,855

ADJUSTABLE HEAD-SUPPORTED BINOCULAR

James E. Gaylor, Huntington Park, Calif.

Application January 30, 1950, Serial No. 141,335

8 Claims. (Cl. 88—36)

This invention relates to a light, head supported binocular, field glass or the like optical instrument to be comfortably held in operative position in front of the eyes of the wearer.

One of the primary objects of this invention is to provide a mounting means for said optical instrument, to be attached to the forehead of the wearer, said mounting means permitting the binocular, field glass or the like to be easily turned from its operative position in front of the wearer's eyes to a raised, inoperative position in which said optical instrument is not in the field of vision of the wearer's eyes.

Another object of the present invention is the provision of means by which each of the casings containing the two optical systems is pivotally mounted on said head supported mounting means in such manner, that the two casings can be adjusted with respect to each other to any desired eye's distance.

A further object of the invention is the provision of an eye shield or cup element of resilient material, such as soft rubber, on that end of each of the two casings containing the optical systems, which faces the wearer's eye, said eye shields or cup elements preventing access of light to the eyes from the sides and being rotatably mounted on said casings, so that the wearer of the optical instrument can readily adjust the eye shields or cup elements to fit the shape of his face, whereby he simultaneously can adjust the instrument to the proper distance between his eyes by swinging the casings with the aid of the pivot means mentioned in the foregoing paragraph.

A still further object of the invention is the provision of casings of the two optical systems made of light metals, such as aluminum, Duralumin or magnesium, or of non-metallic materials, such as natural or synthetic resins, plastics, Celluloid, or the like, which materials are sufficiently strong to support the lenses.

These and other important objects and advantageous features of this invention will be apparent from the following detailed description and drawing, appended thereto, wherein merely for the purposes of disclosure, non-limitative embodiments of this invention are set forth.

In the drawings:

Figure 5 is a front view of another embodiment of the head supported binocular according to this invention.

Figure 6 is a longitudinal section through the binocular shown in Figure 5, taken along the line 6—6 and looking in the direction of the arrows.

Figure 7 is a bottom view of the center hinge of the binocular, illustrated in Figures 5 and 6, on a somewhat enlarged scale.

Figure 8 is a side view, partially in section, of a lens having colored glass and/or a transparent shield to be attached to the front end of each of the two casings of the binocular, shown in Figures 5 and 6.

Figure 1:
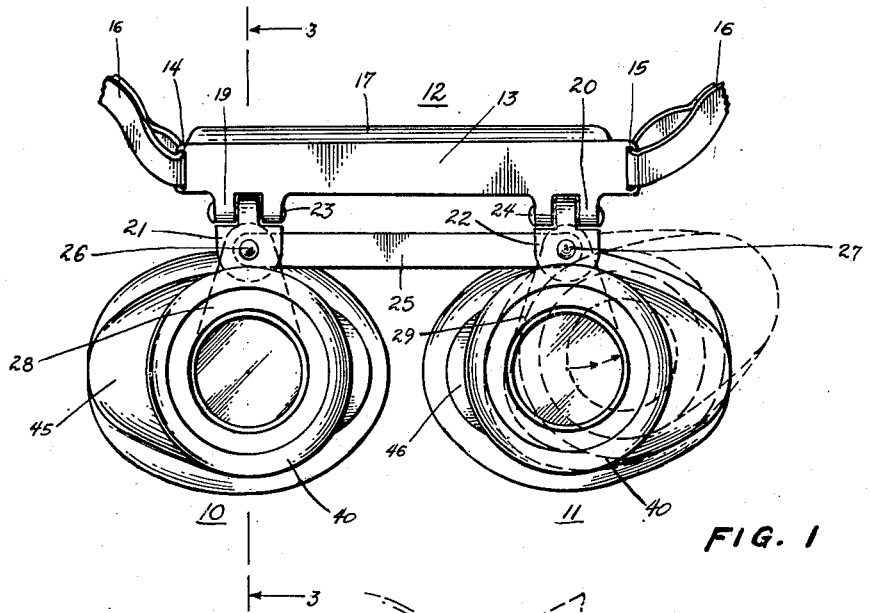
Figure 1 is a front view of an embodiment of the head supported binocular according to the invention.
Figure 2:
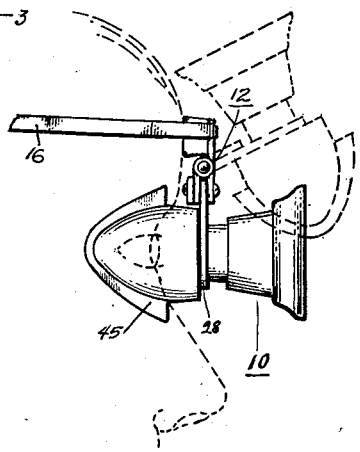
Figure 2 is a side view of the binocular, shown in Figure 1, on a reduced scale, applied to the head and face of the wearer.
Figure 3:
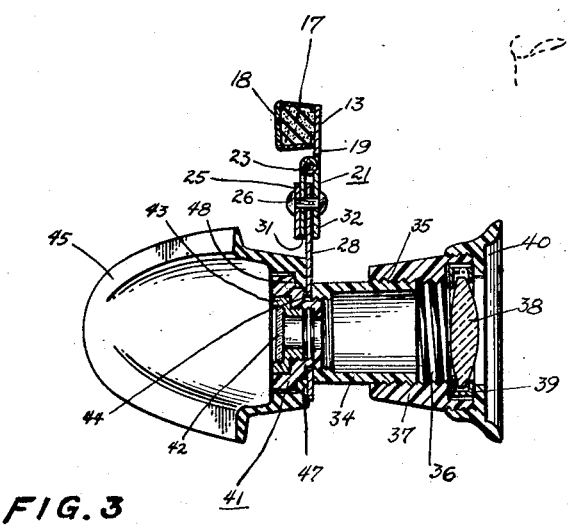
Figure 3 is a longitudinal section through the binocular of Figure 1, taken along the line 3—3 and looking in the direction of the arrows.

In the embodiment of the binocular, illustrated in Figures 1 and 3, a pair of casings 10 and 11, each containing one of the two optical systems, is secured to a head supported mounting means 12 adapted to be applied to the head of the wearer of the binocular, as shown in Figure 2. The mounting means 12 comprises a longitudinal, flat, transverse bar 13 having slots 14 and 15 at its ends. A flexible strap 16, adapted to attach the binocular to the wearer's head, is threaded through said slots. The length of the strap 16 can be readily adjusted in a manner known per se with the aid of conventional strap adjusting means, not shown in the drawing. The rear surface of the transverse bar 13, i. e., the surface facing the wearer's face, is covered by a piece 17 of elastic or resilient material, such as foam or sponge rubber, the rear of which is slightly arched to perfectly fit the wearer's forehead when the binocular is applied thereto. Said soft rubber piece 17 is secured, for example by cementing, to the bar 13. A thin covering 18 of a smooth fabric or the like flexible material may be fastened, for example by cementing, to the free surfaces of said soft rubber piece 17, said covering 18 actually contacting the wearer's forehead.

Hinges of the same size are provided near both ends of the transverse bar 13, spaced apart approximately the average distance between the pupillary axes of the human eyes. Upper hinge parts 19 and 20 of said hinges are suitably made of one piece with the lower edge of said transverse bar 13, and lower hinge parts 21 and 22, respectively, are secured thereto by means of pins 23 and 24, respectively. The lower hinge parts 21 and 23 are interconnected by a joining member or rod 25 and can be made integral with it, for example by welding, brazing, soldering or riveting. In addition to this, rivets or bolts 26 and 27 fasten the rod 25 to the lower hinge parts 21 and 22, respectively. When the mounting means 12 is applied to and across the wearer's forehead approximately at the center level of the forehead, the two lower, joined hinge parts 21 and 22 can be swung together about an axis through the two pins 23 and 24, said axis being substantially parallel to and somewhat above a line joining the two pupillary axes of the wearer's eyes and being substantially perpendicular to said pupillary axes.

Figure 4:
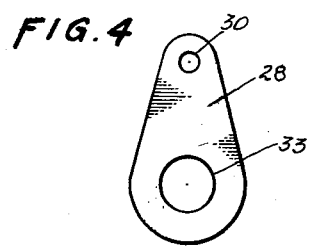
Figure 4 is a front view of one of the means pivotally mounting the casings containing the two optical systems.

The two casings 10 and 11 containing the optical systems are supported by plates 28 and 29 which are pivotally mounted on and between the lower hinge parts 21 and 22, respectively. As shown in Figure 4, plate 28 has an opening 30 near its upper rounded edge, through which the rivet or bolt 26 is passed. Plate 29 has the same opening receiving the rivet or bolt 27.

Figure 3 illustrates the assemblage of the plate 28 between two parallel sheets or layers 31 and 32 forming the lower hinge part 21, said rivet or bolt 26 extending through the joining rod 25, the sheet 31 of the lower hinge part 21, the opening 30 of the plate 28 and the sheet 32 of this hinge part 21. Plate 29 has the same shape and is mounted in the same manner on the lower hinge part 22. The plates 28 and 29 can be freely pivoted independently from each other about the rivets or bolts 26 and 27, respectively, in a plane substantially normal with respect to the pupillary axes of the wearer's eyes, when the binocular is in operative position. A second position to which the casing 11 can be adjusted in this manner, is indicated in Figure 1 with dotted lines. Lock washers, not shown in the drawing, may be inserted in a manner known per se between the rivet or bolt heads or nuts and the joining rod 25 or the lower hinge part 21, so that a slight pressure is exerted on the plates 28 and 29, which pressure has to be overcome, when these plates are swung about the rivets or bolts 26 and 27, respectively, to adjust the interocular distance between the two optical systems. The provision of such inserted lock washers has the advantage that the interocular distance of the two optical systems, after being adjusted, can be retained during the use of the binocular. The lower portion of the plate 28 (see Fig. 4) is provided with a large circular opening 33 adapted to receive the one end of the casing 10 containing the one of the two optical systems. The same circular opening is provided in the lower portion of the plate 29, adapted to receive the one end of the casing 11 containing the other of the two optical systems. The plates 28 and 29 have the general shape of ovals, which are wider at the bottom than at the top.

The inner structure of the casing 10 containing the one optical system and its mounting is illustrated in Figure 3. The casing 11 containing the other optical system and its mounting is principally the same and, therefore, not shown in a separate figure. The casing 10 comprises an inner barrel 34 having outer or male threads 35 at its front end, engaging corresponding female threads 36 in the inner wall of an outer barrel 37. The front end of the outer barrel 37 is recessed to receive an objective lens 38 held in a cell 39. A retaining ring 40 threaded on the front end of the outer barrel 37 secures the lens 38 in the recess of said outer barrel. By rotating the outer barrel 37 on and with respect to the inner barrel 34, the objective lens can be displaced, due to the provision of the threads 38 and 36, in the direction of the pupillary axis with respect to the inner or stationary barrel 34 to focus the optical system. In the same way, the optical system contained in the casing 11 can be focused.

At the rear end of the inner barrel 34, i. e., at the end facing the eye, a socket or flange member 41 is threaded into said inner barrel 34. An eye lens 42 is mounted in said flange or socket member 41 by means of a smaller retaining socket or ring member 43, which may be threaded into the socket or flange member 41. The front portion of said socket or flange member 41, which is threaded into the rear end of the inner barrel 34, is passed through the opening 33 of the plate 28, said opening having the same diameter as the outer diameter of said threaded front portion. The inner barrel 34 is secured to the plate 28 by tightly screwing the socket member 41 into said inner barrel 34, whereby said plate 28 inserted between the end of the inner barrel 34 and a first flange or ring surface 44 of the socket member 41 is firmly held between the latter parts.

Eye shields or cup elements 45 and 46 of flexible material, such as soft natural or synthetic rubber, plastic, or the like, are rotatably mounted on the rear ends of the casings 10 and 11, respectively, by means of said socket members 41. As shown in Figure 3, a flange 47 formed at the front end of the eye shield 45 is inserted between plate 28 and a second flange or ring surface 48 of said socket member 41 in such a manner, that said eye shield 45 can be easily turned with respect to the socket member 41 to adjust its position, so that the eye shield 45 properly covers the sides between the wearer's face and the binocular preventing the access of light to the eye from said sides. When the interocular distance of the binocular is changed by swinging the plates 28 and 29 together with the casings 10 and 11 mounted thereon about the rivets or bolts 26 and 27, respectively, a readjusting of the eye shields may be necessary, because the eye shields 45 and 46 are attached to said casings 10 and 11 and participate in the swinging movements.

While the elements of the head-supported mounting means of the optical instrument, such as the transverse bar 13, the hinges associated therewith, the joining member 25 and the plates 28 and 29 are suitably made of light metal, such as aluminum, Duralumin, magnesium, or their alloys, the casings 10 and 11 containing the optical systems are partially or entirely made of plastic, synthetic or natural hard rubber, resins of Celluloid, which materials are rigid enough to support the lenses. It is important that the materials used for these casings 10 and 11 are light and, simultaneously, so rigid that the walls of the casings 10 and 11 can be made very thin to reduce their weight to a great extent.

The new head supported binocular can be readily swung by the wearer about the axis through the hinge pins 23 and 24 from the operative position, shown in full lines in Figure 2, to a raised or inoperative position out of the field of vision, said position bein indicated by dotted lines in the same figure. The binocular is retained in this inoperative position due to a suitable location of the center of gravity in the binocular and can be easily returned to its operative position. When the hands of the wearer grip the casings 10 and 11 to return the binocular to its operative position, they can simultaneously adjust the eye's distance by slightly displacing or swinging each of said casings in front of the wearer's eyes in a plane substantially normal with respect to the pupillary axes of his eyes. At the same time, the eye shields 45 and 46 can be adjusted by slight rotation on the inner barrels 34 to perfectly fit the wearer's face and the optical system can be focused.

The new optical instrument can be used for various purposes. It is very useful as theater glass, and can be likewise advantageously used by the spectators of sports events, races, outdoor movies and television shows. If need, colored lenses, for example bluish-green colored lenses, may be provided in the optical systems to filter the rays passing therethrough.

The invention can be applied to eyeshields or goggles of the type protecting the eyes of the wearer from flying particles, heat, harmful light rays, etc. Such goggles are used by workers in factories, particularly by welders. In this type of goggles, the eye lenses 42 (see Figure 3) of the optical systems can be ordinarily omitted and the objective lenses 38 are replaced by transparent shields of non-shatterable material which may be colored.

In the modified embodiment, shown in Figures 5, 6 and 7, of the binocular according to this invention, a pair of casings 110 and 111 each containing one of the two optical systems is attached to a head-supported mounting means 112 which can be readily applied to the wearer's head, in the same manner as the binocular illustrated in Figures 1 to 3. This head-supported mounting means 112 comprises a longitudinal, flat transverse bar 113, the ends of which are provided with slots 114 and 115, adapted to receive a flexible head strap 116. A piece 117 of elastic or resilient material of similar shape and construction as the piece 17 in the embodiment of Figures 1, 2, and 3 is provided on the rear surface of the transverse bar 113. A covering similar to the smooth fabric 18, shown in Figure 2, may be provided on the elastic piece 117.

Equal hinges are provided close to the ends of the transverse bar 113, the vertical center lines through said hinges being spaced apart somewhat less than the average distance between the pupillary axes of the human eyes. These hinges comprise outer hinge parts 119 and 120 suitably made of one piece with and projecting from the lower edge of said transverse bar 113 and inner hinge parts 121 and 122. The respective outer and inner hinge parts are joined by means of pins or spanner bolts 123 and 124, the axes of which coincide and are substantially parallel with respect to the longitudinal center lines through the transverse bar 113 and substantially perpendicular with respect to the pupillary axes of the two optical systems. The bolts 123 and 124 can be tightened by means of spanner nuts 150 and 151, respectively, whereby the desired friction between the outer and inner parts of these two hinges can be readily adjusted in such a manner that the casings 110 and 111 with the optical systems, when swung into the inoperative position, indicated in Figure 6 with dotted lines, will be safely retained in said position due to the friction between these hinge parts. Washers may be inserted between the cooperating hinge parts. The inner hinge parts 121 and 122 are interconnected by means of a joining member 125, these inner hinge parts 121 and 122 constituting end portions of said joining member 125, suitably made integral with and projecting from it substantially perpendicularly.

As shown in Figure 5, the joining member 125 is slightly curved and a forked element 152 is provided at the center of its lower side, said forked element being suitably made integral with said joining member 125. The forked element 152 comprises two parallel arms 131 and 132, between which the upper ends of two elbow members 128 and 129 are hingedly mounted by means of a pin or spanner bolt 126 passing through said arms and said elbow members and being tightened by a spanner nut 156. These upper ends of the two elbow members 128 and 129 are made in form of interfitting opposed lugs 154 and 155 of half of the width of said members from which they project, so that the two lugs together have the full width of either member 128 or 129 when assembled (see Figure 6). Washers may be inserted between the two lugs and/or each lug and its adjacent fork arm. The elbow members 128 and 129 can swing freely and independently of one another within the forked element 152 about the bolt 126. The lower portions of the elbow members 128 and 129 are disposed at opposite sides of the binocular, each of said portions being provided with a large circular opening 133 (see Figure 6) adapted to receive one of the casings 110 and 111, respectively, of the two optical systems. These casings 110 and 111 are mounted in the circular openings 133 of the lower portions of the elbow members 128 and 129, respectively, in substantially the same manner as the casings 10 and 11 in Figures 1 to 3 are secured to the plates 28 and 29, respectively.

The inner structure of the casings 110, shown in Figure 6, is similar to that of the casing 10, shown in Figure 3. The casing 110 comprises an inner barrel 134 having outer or male threads 135 at its front end, engaging corresponding female threads 136 in the inner wall of an outer barrel 137. An achromatic doublet objective lens 138, held in a retaining ring 140, is secured to the front end of the outer barrel 137 by threading this retaining ring into said front end. The objective lens 138 can be displaced in the direction of the pupillary axis by rotating the outer barrel 137 on and with respect to the inner barrel 134, to focus the optical system.

The front portion of a socket or flange member 141 is threaded into the rear end of the inner barrel 134. A double concave or negative eye lens 142 is mounted in said flange or socket member 141 by means of a retaining ring 143 threaded into said member 141. The rear end of the inner barrel 134 is passed through the opening 133 in the lower portion of the elbow member 128, said opening having the same diameter as the outer diameter of said rear end. The inner barrel 134 is firmly mounted on and in said elbow member 128 by tightly screwing the socket member 141 into said inner barrel 134, whereby the lower portion of this elbow member 128 inserted between the end of the inner barrel 134 and a first flange or ring surface 144 of the socket member 141 is securely clamped between the said latter parts.

The optical system in the casing 111 (see Figure 5) is constructed in the same way as that in the casing 110 and can be focussed in the same manner. Therefore, no description of the inner construction of the casing 111 is necessary. As in the embodiment of this invention illustrated in Figures 1 to 3, eye shields 145 and 146 of flexible material, such as rubber, plastic, etc., are rotatably mounted on the rear ends of the casings 110 and 111, respectively, of the modification, shown in Figures 5 and 6. A flange 147 formed at the front end of the eye shield 145 is inserted between the lower portion of the elbow member 128 and a flange or ring surface 148 of the socket member 141 in such a manner, that said eye shield 145 can be readily turned with respect to the socket member 141 to adjust its position in the same way as in the embodiment of Figures 1 to 3. The eye shield 146 is rotatably mounted on the casing 111 in the same manner as the shield 145 on the casing 110.

The structural elements of the binocular, shown in Figures 5 to 8, are suitably made of light metal, such as Duralumin.

As shown in Figure 8, a lens 160 of colored glass, mounted in a retaining ring 161, may be provided for each of the two optical systems. This ring 161, which is preferably made of metal, such as Duralumin, has a flange or socket portion 162 on the one side, said portion being adapted to resiliently fit over the front ends of the outer barrels 137 of each of the casings 110 and 111. The resiliency of this flange or socket portion 162 is obtained by the provision of slots 163 in the wall of said flange or socket portion. In case of goggles for welders or other workers to be protected from flying particles, the glass lenses 160 are replaced by transparent shields of non-shatterable material and the objective and eye lenses will be ordinarly omitted.

The binocular according to Figures 5 and 6 is handled in the same manner as that of Figures 1 to 3. While the latter has two hinges (see pivot bolts 26 and 27 in Figure 1) for the adjustment of the interocular distance, a single hinge (see spanner bolt 126 in Figure 5) is provided as pivot for the two casings 110 and 111.

As the new optical instruments are extremely light and have soft or padded portions of suitable shapes contacting the user's forehead and face, they can be worn without discomfort. If the user wants momentarily to remove the binocular in front of his eyes without removing the mounting means 12 or 112 from his head, he simply swings the binocular upwards to its raised position, from where it can be readily returned to its operative position.

The invention may be applied to binocular magnifiers used by watchmakers, jewelers, etc. Also in these binoculars, no eye lenses are normally used and the objective lenses are suitable magnifying glasses permitting the work pieces or articles to be viewed at the regular distance of 13 to 18 inches from the eyes. In view of these relative short distances, the axes of the casings containing the two optical systems have to converge or prisms may be built into the two casings of the optical systems, directing the optical axes to one point.

Any other optical system than those described and shown may be employed in the new device. For example, prescription lenses correcting faulty vision may be combined with the optical systems, so that the user of the new binocular does not have to wear separate eyeglasses, when using the new binocular. All of the lenses of the new binocular can be easily replaced or exchanged by removing their retaining rings from the casings.

While the invention has been described substantially with reference to specific embodiments thereof, it will be understood that changes and modifications may be made in the structure described and illustrated without departing from the spirit of the invention or exceeding the scope of the claims.

I claim:

1. A head-supported binocular comprising in combination a mounting means of the type to be attached to and across the wearer's forehead, two casings, each of them containing lenses for one of the wearer's eyes, hinge means between said mounting means and said casings, said hinge means having an axis substantially parallel to and somewhat above a line joining the two pupillary axes of the wearer's eyes and substantially perpendicular with respect to said pupillary axes, so that said two casings can be turned from their normal operative position in front of the wearer's eyes to a raised and inoperative position and vice versa, at least one pivot means between said hinge means and said casings, said pivot means having an axis substantially parallel with respect to the pupillary axes of the wearer's eyes, and clamping means on said pivot means to frictionally engage projecting portions of said casings, so that said projecting portions with said casings can be swung independently from one another in front of the wearer's eyes about said pivot axis in a plane substantially perpendicular with respect to said pupillary axes to adjust the proper interocular distance, said clamping means exerting such friction on said projecting parts that the adjusted position of said casings will be retained.

2. A head-supported binocular according to claim 1, wherein said clamping means comprises fork-like extensions of said pivot means, said extensions having two legs spaced from and parallel with respect to one another to receive said projecting portions therebetween.

3. A head-supporting binocular according to claim 1, wherein two clamping means are provided to separately mount each of said projecting portions of said casings, said two clamping means being rigidly interconnected by a joining bar.

4. A head-supporting binocular according to claim 1, wherein each of said projecting portions of said casings is part of a plate, said plate being formed with a large opening adapted to receive one of the ends of its respective casing, and wherein a socket means threaded into said casing secures said plate thereto.

5. A head-supported binocular according to claim 4, wherein lens seats are formed within said socket means to receive lenses and wherein retaining rings for said lenses are threaded into said socket means.

6. A head-supported binocular comprising in combination, a mounting means of the type to be attached to and across the wearer's forehead, two casings, each of them containing lenses for one of the wearer's eyes, hinge means between said mounting means and said casings, said hinge means having an axis substantially parallel to and somewhat above a line joining the two pupillary axes of the wearer's eyes and substantially perpendicular with respect to said pupillary axes, so that said two casings can be turned from their normal operative position in front of the wearer's eyes to a raised and inoperative position and vice versa, a single pivot means between said hinge means and said two casings, said pivot means having an axis substantially parallel with respect to the pupillary axes of the wearer's eyes, a fork-like extension having two legs spaced from and parallel with respect to each other, portions extending from each of said casings and having free ends, said free ends being jointly inserted between and pivotally mounted by said legs and frictionally held therebetween, so that said extending portions together with their respective casings can be swung independently from one another in front of the wearer's eyes about said pivot axis in a plane substantially perpendicular with respect to said pupillary axes to adjust the proper interocular distance, said fork legs exerting such friction on said ends of said extending portions that the adjusted position of said casings will be retained.

7. A head-supported binocular according to claim 6, wherein each of said free ends of said portions extending from said casings has a lug of half of the thickness of said portion, said free ends being pivotally mounted between said legs with said lugs interfittingly opposing each other.

8. A head-supported binocular according to claim 6, wherein said portions extending from said casings are elbow-shaped members having their free ends in a substantially horizontal position in the normal operative position of said binocular, said free ends being pivotally mounted between said fork legs.

JAMES E. GAYLOR.

REFERENCES CITED

The following references are of record in the file of this patent:

UNITED STATES PATENTS

| Number | Name | Date |
|---|---|---|
| 572,637 | Heyn | Dec. 8, 1896 |
| 1,963,990 | Gilkeson et al. | June 26, 1934 |
| 2,187,542 | Hagen | Jan. 16, 1940 |